(12) United States Patent
Yao et al.

(10) Patent No.: US 12,326,328 B2
(45) Date of Patent: *Jun. 10, 2025

(54) CAMERA HAVING TWO EXPOSURE MODES AND IMAGING SYSTEM USING THE SAME

(71) Applicant: PixArt Imaging Inc., Hsin-Chu (TW)

(72) Inventors: Wen-Han Yao, Hsin-Chu County (TW); Wen-Cheng Yen, Hsin-Chu County (TW); Han-Chang Lin, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 206 days.

This patent is subject to a terminal disclaimer.

(21) Appl. No.: 18/070,680

(22) Filed: Nov. 29, 2022

(65) Prior Publication Data
US 2023/0093565 A1 Mar. 23, 2023

Related U.S. Application Data

(63) Continuation of application No. 16/881,437, filed on May 22, 2020, now Pat. No. 11,614,322, which is a
(Continued)

(30) Foreign Application Priority Data

Nov. 4, 2014 (TW) .................................. 103138317

(51) Int. Cl.
*G06V 10/40* (2022.01)
*G01B 11/14* (2006.01)
(Continued)

(52) U.S. Cl.
CPC .............. *G01B 11/14* (2013.01); *G06V 10/40* (2022.01); *G06V 10/60* (2022.01); *H04N 23/71* (2023.01);
(Continued)

(58) Field of Classification Search
CPC ........ G01B 11/14; G06V 10/60; G06V 10/40; G06V 10/467; H04N 23/73; H04N 23/741; H04N 23/71
See application file for complete search history.

(56) References Cited

U.S. PATENT DOCUMENTS

2006/0029382 A1* 2/2006 Uchida ................ H04N 5/2625
348/E5.038
2006/0284895 A1* 12/2006 Marcu ...................... G09G 3/20
345/690
(Continued)

*Primary Examiner* — Dave Czekaj
*Assistant Examiner* — Berteau Joisil
(74) *Attorney, Agent, or Firm* — HAUPTMAN HAM, LLP

(57) ABSTRACT

There is provided an imaging system including a camera and a control host. The camera identifies ambient light intensity and performs trigger event detection in a low power mode. When the camera detects a trigger event in the low power mode, the control host is woken up. The camera also determines an exposure mode according the ambient light intensity and informs the exposure mode to the control host such that an operating mode of the control host after being woken up matches the exposure mode of the camera.

20 Claims, 11 Drawing Sheets

Related U.S. Application Data continuation-in-part of application No. 16/601,648, filed on Oct. 15, 2019, now Pat. No. 11,221,207, which is a continuation of application No. 14/731,713, filed on Jun. 5, 2015, now Pat. No. 10,488,181.

(60) Provisional application No. 62/886,429, filed on Aug. 14, 2019.

(51) Int. Cl.
*G06V 10/60* (2022.01)
*H04N 23/71* (2023.01)
*H04N 23/73* (2023.01)
*H04N 23/741* (2023.01)
*G06V 10/46* (2022.01)

(52) U.S. Cl.
CPC ........... *H04N 23/73* (2023.01); *H04N 23/741* (2023.01); *G06V 10/467* (2022.01)

(56) References Cited

U.S. PATENT DOCUMENTS

| | | | | |
|---|---|---|---|---|
| 2008/0143832 A1* | 6/2008 | Bramoulle | ........... | G08B 13/196 348/E7.085 |
| 2009/0109323 A1* | 4/2009 | Muraki | ................. | G03B 7/003 348/E5.024 |
| 2009/0110322 A1* | 4/2009 | Hadap | ................. | G06T 15/506 382/274 |
| 2014/0125775 A1* | 5/2014 | Holz | .................... | H04N 13/275 348/49 |

* cited by examiner

CAMERA HAVING TWO EXPOSURE MODES AND IMAGING SYSTEM USING THE SAME

RELATED APPLICATIONS

The present application is a continuation application of U.S. application Ser. No. 16/881,437, filed on May 22, 2020, which claims the priority benefit of U.S. Provisional Application Ser. No. 62/886,429, filed on Aug. 14, 2019, and is a continuation-in-part application of U.S. application Ser. No. 16/601,648, filed on Oct. 15, 2019, which is a continuation application of U.S. application Ser. No. 14/731,713, filed on Jun. 5, 2015, which is based on and claims priority to Taiwanese Application Number 103138317, filed Nov. 4, 2014, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an imaging system and, more particularly, to a camera that determines the exposure mode in a low power mode according to ambient light intensity and an imaging system using the same.

2. Description of the Related Art

An optical distance measurement system may calculate an object distance using a triangulation method. For example, the optical distance measurement system includes a light source and a camera. The light source projects light to an object to be detected, and the camera receives reflected light from the object to be detected to generate an image frame. When a spatial relationship between the light source and the camera is already known, a distance of the object to be detected is obtainable using the triangulation method according to an object image position in the image frame.

However, when a plurality of objects at different distances is present in the space at the same time, an object at a near distance could cause over exposure whereas an object at a far distance could cause under exposure such that the calculation accuracy of the optical distance measurement system is degraded. Especially, when the object at a far distance is under exposure, it may not be able to calculate the object distance of the object at a far distance.

Therefore in the imaging system, it is desired to have high signal-to-noise ratios in both bright regions and dark regions of an acquired image to increase the accuracy of the followed identification and control. Accordingly, it is necessary to provide an imaging system that can obtain images having high signal-to-noise ratios under different ambient light intensity.

SUMMARY

The present disclosure further provides a camera that determines an exposure mode used in the image recording according to ambient light intensity and an imaging system using the same in which a control host correctly matches the exposure mode selected by the camera in receiving a first image frame therefrom after the control host is woken up.

The present disclosure provides a camera including an image sensor and a processor. The image sensor is embedded with a digital-overlap (DOL) mode and a dual-conversion-gain (DCG) mode, and configured to generate images successively. The processor is coupled to the image sensor and configured to, in a low power mode, identify ambient light intensity, control the image sensor to operate in the DOL mode after waking up when the ambient light intensity is larger than a first brightness threshold, and control the image sensor to operate in the DCG mode after waking up when the ambient light intensity is smaller than a second brightness threshold.

The present disclosure further provides an imaging system including a camera and a control host. The camera is embedded with a digital-overlap (DOL) mode and a dual-conversion-gain (DCG) mode, and configured to, in a low power mode, identify ambient light intensity, output a DOL mode signal, a first exposure image and a second exposure image after waking up when the ambient light intensity is larger than a first brightness threshold, and output a DCG mode signal and a gain synthesis image after waking up when the ambient light intensity is smaller than a second brightness threshold. The control host is configured to generate an exposure synthesis image according to the first exposure image and the second exposure image when the DOL mode signal is received, and record the gain synthesis image when the DCG mode signal is received.

The present disclosure further provides an imaging system including a camera and a control host. The camera is embedded with a digital-overlap (DOL) mode and a dual-conversion-gain (DCG) mode, and configured to, in a low power mode, perform an auto exposure procedure when a trigger signal is generated to determine an exposure time and a conversion gain to accordingly calculate and output a brightness parameter, operate in the DOL mode to output different exposure images when the brightness parameter is smaller than a parameter threshold, and operate in the DCG mode to output a gain synthesis image when the brightness parameter is larger than the parameter threshold. The control host is configured to receive the brightness parameter to accordingly identify a data format of images sent by the camera, wherein the trigger signal and the brightness parameter are received by the control host with a predetermined time interval difference, and the auto exposure procedure is accomplished within the predetermined time interval.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
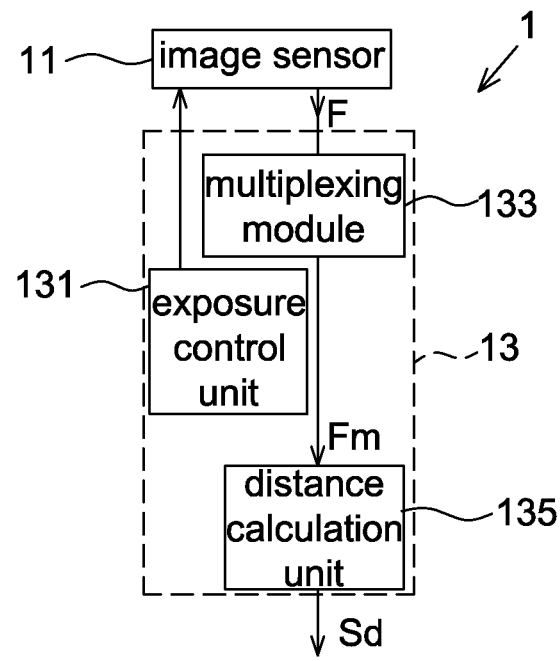
FIG. 1 is a schematic block diagram of an optical distance measurement system according to one embodiment of the present disclosure.

Referring to FIG. 1, it is a schematic block diagram of an optical distance measurement system according to one embodiment of the present disclosure. The optical distance measurement system 1 includes an image sensor 11 and a processing unit 13. The image sensor 11 is preferably an active image sensor, e.g. a CMOS image sensor, which may change an exposure time for capturing an image F or respectively capture different image regions of the image F with a plurality of exposure times (illustrated below).

The processing unit 13 is, for example, a digital signal processor (DSP), a microcontroller (MCU) or a central processing unit (CPU), and configured to receive images F outputted by the image sensor 11 to perform the post-processing and to control the image capturing of the image sensor 11. In one embodiment, the processing unit 13 includes an exposure control unit 131, a multiplexing module 133 and a distance calculation unit 135, wherein the exposure control unit 131, the multiplexing module 133 and the distance calculation unit 135 are data processors in the processing unit 13 and may be implemented by software or hardware without particular limitations. It is appreciated that although FIG. 1 shows that the processing unit 13 includes different operation modules for illustration purpose, it can be said that the functions executed by these operation modules in the processing unit 13 are executed by the processing unit 13.

The exposure control unit 131 is configured to control the image sensor 11 to capture all image regions of different images F with different exposure times (i.e. one image corresponding to one exposure time), or to capture different image regions of a same image F with a plurality of exposure times (i.e. one image corresponding to a plurality of exposure times). The multiplexing module 133 is configured to process the images F received by the processing unit 13 in a time multiplexed manner or a spatially multiplexed manner, and generate an image to be calculated Fm (e.g. the combined image or current image mentioned below). The distance calculation unit 135 is configured to calculate at least one object distance according to the image to be calculated Fm using a predetermined algorithm, e.g. calculating the object distance using the triangulation method.

Figure 2:
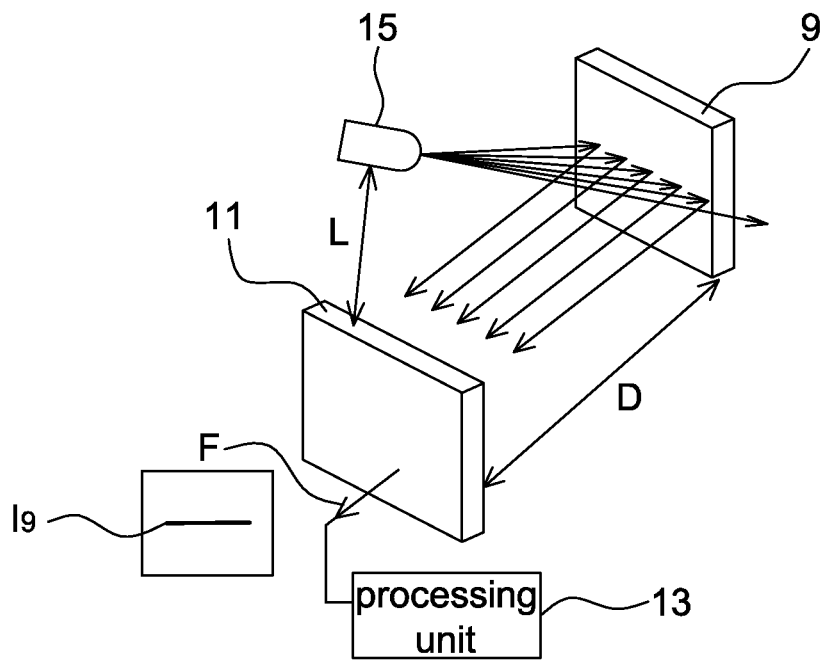
FIG. 2 is a schematic diagram of an optical distance measurement system according to one embodiment of the present disclosure.

Referring to FIG. 2, it is a schematic diagram of an optical distance measurement system according to one embodiment of the present disclosure. The optical distance measurement system 1 may further include a light source 15 configured to project a two-dimensional light section (e.g. an optical line with a predetermined width) onto an object 9, wherein the light source 15 is, for example, a coherent light source, a partially coherent light source or an incoherent light source without particular limitations. The light source 15 is configured to emit visible light or invisible light. The image sensor 11 receives reflective light from the object 9 and then generates an image F containing a reflective light image 19 to be sent to the processing unit 13. The processing unit 13 firstly uses the multiplexing mechanism (illustrated by examples below) of the present disclosure to generate an image to be calculated Fm according to the image F, and then calculates at least one object distance D according to the image to be calculated Fm, wherein the image to be calculated Fm also includes a reflective light image 19. More specifically speaking, at least a part of a plurality of exposure times corresponding to different image regions of the image to be calculated Fm are different from each other (illustrated by examples below) such that the brightness of the reflective light image 19 in each of the image regions is suitable to calculate the object distance D. In addition, in some embodiments the processing unit 13 outputs the image to be calculated Fm in a wired or wireless manner to an external device, e.g. an external host, to be post-processed. It should be mentioned that although FIG. 2 shows that the two-dimensional light section projected by the light source 15 is not a continuous section, but it is only intended to illustrate but not to limit the present disclosure.

In one embodiment, the processing unit 13 may include a storage unit (not shown) for storing a look-up table, which includes the relationship of positions of the reflective light image 19 versus object distances D. Accordingly, after the processing unit 13 obtains the position of the reflective light image 19 in the image to be calculated Fm, at least one object distance D is obtainable directly according to the look-up table, wherein the look-up table is calculated according to a spatial relationship (e.g. a distance L) between the light source 15 and the image sensor 11 and according to a projection angle of the light source 15, and the look-up table is previously stored in the storage unit. In another embodiment, the storage unit of the processing unit 13 stores a distance calculation algorithm, and after the position of the reflective light image 19 in the image to be calculated Fm is obtained, at least one object distance D is calculated according to the distance calculation algorithm.

In the embodiments of the present disclosure, as the light source 15 is configured to project a two-dimensional light section, the image F outputted by the image sensor 11 contains a linear reflective light image 19. The processing unit 13 is able to calculate a plurality of object distances at the same time (e.g. different objects corresponding to different parts of the reflective light image and at different positions) to have a better adaptability. Finally, the processing unit 13 outputs, e.g. to a host or a computer system, the calculated object distance D to perform corresponding controls, wherein the controllable function corresponding to the object distance D is determined according to different applications.

Figure 3:
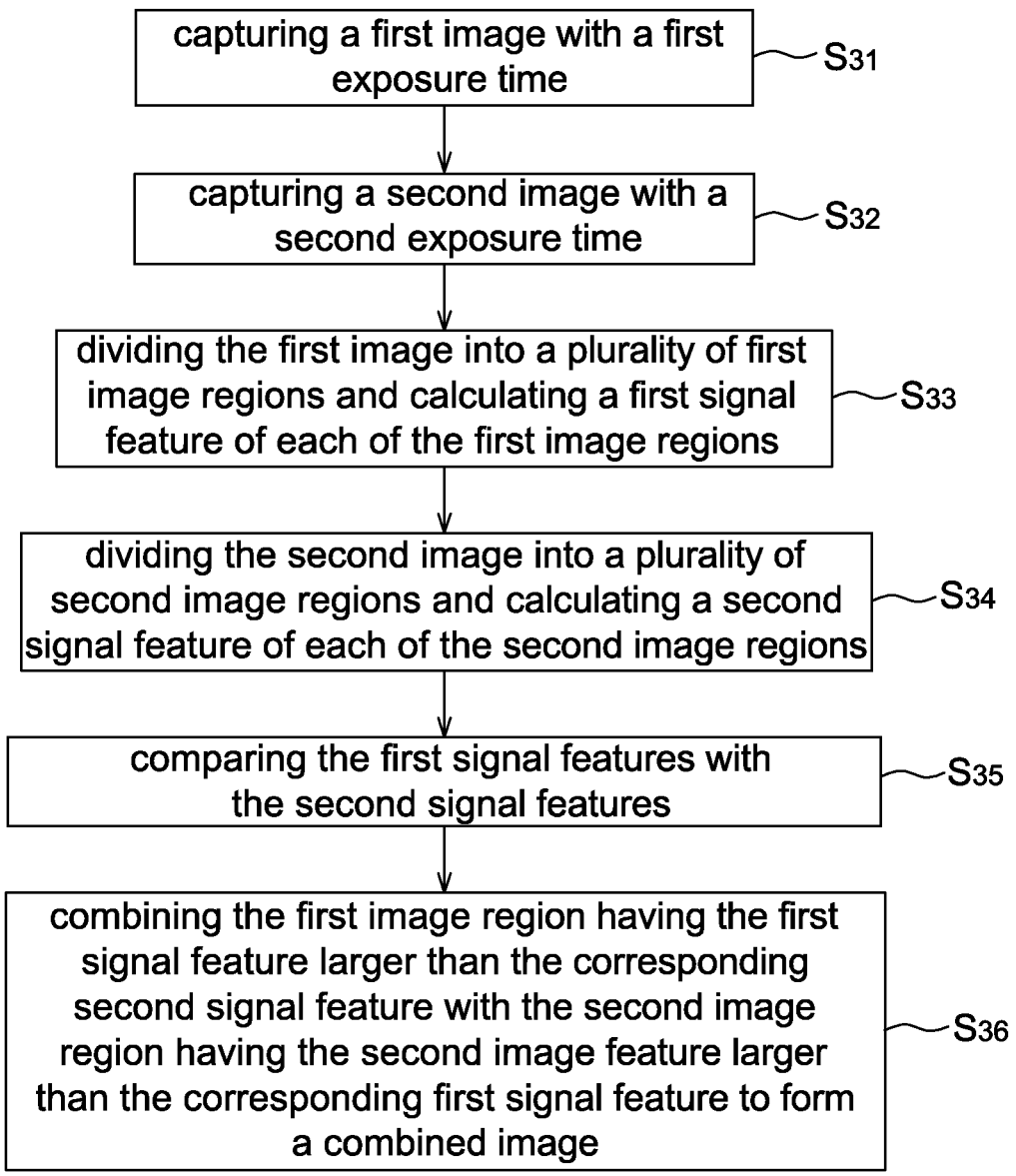
FIG. 3 is a flow chart of a distance measurement method of an optical distance measurement system according to a first embodiment of the present disclosure.

Referring to FIG. 3, it is a flow chart of a distance measurement method of an optical distance measurement system according to a first embodiment of the present disclosure, which includes the steps of: capturing a first image with a first exposure time (Step S31); capturing a second image with a second exposure time (Step S32); dividing the first image into a plurality of first image regions and calculating a first signal feature of each of the first image regions (Step S33); dividing the second image into a plurality of second image regions and calculating a second signal feature of each of the second image regions (Step S34); comparing the first signal features with the second signal features (Step S35); and combining the first image region having the first signal feature larger than the corresponding second signal feature with the second image region having the second image feature larger than the corresponding first signal feature to form a combined image (Step S36).

Referring to FIGS. 1-3 and 4A-4B together, details of the first embodiment are illustrated hereinafter. The processing unit 13 controls the light source 15 to activate when the image sensor 11 is capturing an image F such that the image F captured by the image sensor 11 contains a reflective light image 19 from the object 9 to accordingly calculate an object image D of the object 9.

Step S31: The image sensor 11 is controlled by the exposure control unit 131 of the processing unit 13 to capture a first image $F_S$ with a first exposure time $ET_S$.

Figure 4A:
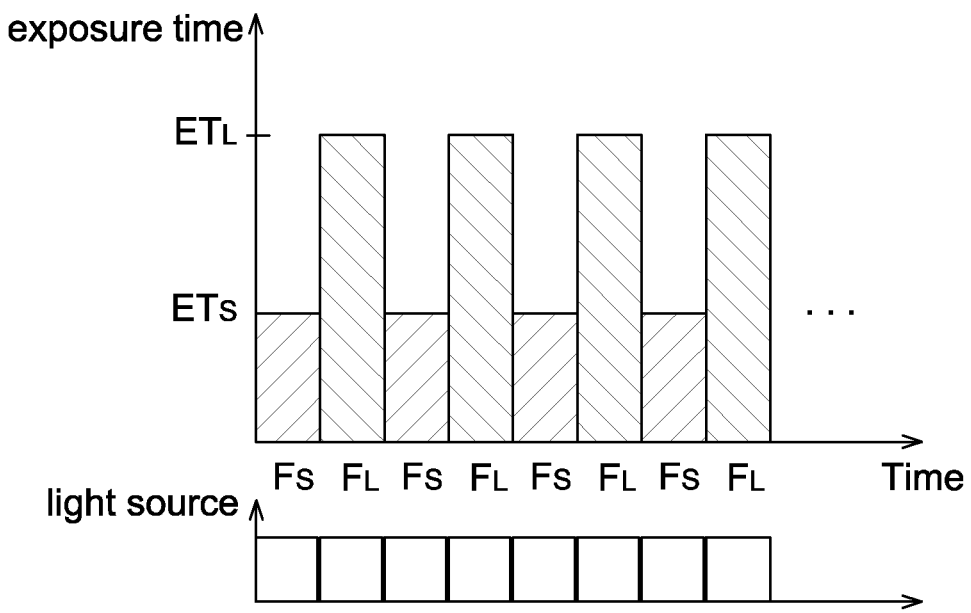
FIG. 4A is a timing diagram of the image capturing of an optical distance measurement system according to the first embodiment of the present disclosure.

Step S32: Then, the image sensor 11 is controlled by the processing unit 13 to capture a second image $F_L$ with a second exposure time $ET_L$, wherein the first image $F_S$ and the second image $F_L$ are two images F successively or separated by at least one image captured by the image sensor 11, and the first exposure time $ET_S$ is different from the second exposure time $ET_L$. It should be mentioned that although FIG. 4A shows that the first exposure time $ET_S$ is smaller than the second exposure time $ET_L$, the present disclosure is not limited thereto. In some embodiments, the first exposure time $ET_S$ is larger than the second exposure time $ET_L$. In one embodiment, the exposure control unit 131 of the processing unit 13 controls the image sensor 11 to capture images alternatively with the first exposure time $ET_S$ and the second exposure time $ET_L$.

Step S33: After the processing unit 13 receives the first image $F_S$, the multiplexing module 133 divides, in a predetermined manner, the first image $F_S$ into a plurality of first image regions, e.g. A1 to A4 (referring to FIG. 4B), and calculates a first signal feature C1 to C4 of each of the first image regions A1 to A4 (referring to FIG. 4B), wherein each of the first image regions A1 to A4 is one pixel row, a plurality of pixel rows, one pixel column, a plurality of pixel columns or a rectangular pixel region of the first image $F_S$, and is not limited to that shown in FIG. 4B. In one embodiment, the signal features C1 to C4 are signal-to-noise ratios (SNR) of the first image regions A1 to A4, respectively. For example, the multiplexing module 133 separates signal data and noise data in each of the first image regions A1 to A4 according to a dynamic threshold, and calculates a ratio of an energy sum of all signal data and an energy sum of all noise data in each of the first image regions A1 to A4 to be configured as the SNR. In one embodiment, the dynamic threshold is selected as, for example, an average value obtained by dividing a maximum energy of one first image region by a sum of average energy of all first image regions, but the present disclosure is not limited thereto. Accordingly, one threshold is obtained for each of the first image regions A1 to A4. As the threshold for each of the first image regions A1 to A4 is calculated according to the captured image data, the thresholds may be different from each other and thus the thresholds are referred to dynamic thresholds in the present disclosure.

Step S34: Similarly, after the processing unit 13 receives the second image $F_L$, the multiplexing module 133 divides, in the predetermined manner (identical to the Step S33), the second image $F_L$ into a plurality of second image regions, e.g. A1' to A4' (referring to FIG. 4B), and calculates a second signal feature C1' to C4' of each of the second image regions A1' to A4' (referring to FIG. 4B), wherein each of the second image regions A1' to A4' is one pixel row, a plurality of pixel rows, one pixel column, a plurality of pixel columns or a rectangular pixel region of the second image $F_L$, and is not limited to that shown in FIG. 4B. Similarly, the signal features C1' to C4' are signal-to-noise ratios (SNR) of the second image regions A1' to A4', respectively. For example, the multiplexing module 133 separates signal data and noise data in each of the second image regions A1' to A4' according to a dynamic threshold, and calculates a ratio of an energy sum of all signal data and an energy sum of all noise data to be configured as the SNR. The method of determining the dynamic threshold is similar to that of Step S33 and thus details thereof are not repeated herein.

Step S35: Next, the multiplexing module 133 compares the first signal feature of each of the first image regions A1 to A4 with the second signal feature of the corresponding second image regions A1' to A4'. For example, the multiplexing module 133 compares the first signal feature C1 of the first image region A1 with the second signal feature C1' of the second image region A1'; compares the first signal feature C2 of the first image region A2 with the second signal feature C2' of the second image region A2'; compares the first signal feature C3 of the first image region A3 with the second signal feature C3' of the second image region A3'; and compares the first signal feature C4 of the first image region A4 with the second signal feature C4' of the second image region A4'.

Step S36: Next, the multiplexing module 133 combines, in a time multiplexed manner, a part of image regions of the first image $F_S$ with a part of image regions of the second image $F_L$ to form a combined image Fm. In one embodiment, the multiplexing module 133 combines the first image region having the first signal feature larger than the corresponding second signal feature with the second image region having the second image feature larger than the corresponding first signal feature to form a combined image Fm. For example, it is assumed herein that the first signal features C1 and C4 are respectively larger than the second signal features C1' and C4', and this means that the first image regions A1 and A4 are more suitable to calculate a correct object distance than the second image regions A1' and A4'. Meanwhile, it is assumed herein that the first signal features C2 and C3 are respectively smaller than the second signal features C2' and C3', and this means that the second image regions A2' and A3' are more suitable to calculate a correct object distance than the first image regions A2 and A3. Then, the multiplexing module 133 forms a combined image Fm which includes image regions A1, A2', A3' and A4 as shown in FIG. 4B.

Figure 4B:
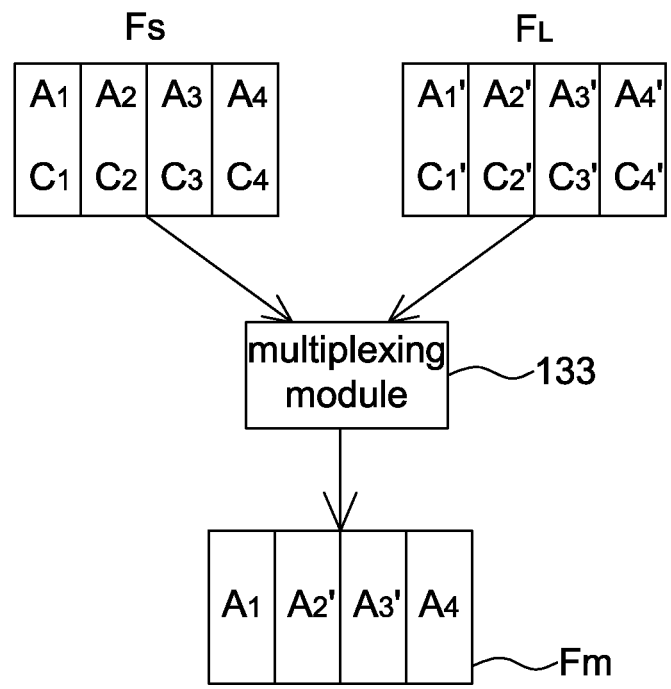
FIG. 4B is an operational schematic diagram of an optical distance measurement system according to the first embodiment of the present disclosure.

It is appreciated that although FIG. 4B shows that a combined image Fm respectively includes a part of image regions of the first image $F_S$ (e.g. A1 and A4) and a part of image regions of the second image $F_L$ (e.g. A2' and A3'), but the present disclosure is not limited thereto. According to the image F actually captured by the image sensor 11, the combined image Fm may be identical to the first image $F_S$ or the second image $F_L$.

Finally, the distance calculation unit 135 of the processing unit 13 calculates at least one object distance D according to the combined image Fm. It should be mentioned that in this embodiment a number of said at least one object distance may be determined according to a number of pixel rows of the image F. For example, one object distance is obtained corresponding to each pixel row, or one object distance is obtained corresponding to a plurality of pixel rows (e.g. 2 to 5 pixel rows) depending on the identification resolution. The distance calculation unit 135 also identifies an object number according to the plurality of object distances being obtained, and merges the object distances associated with the same object to one object distance such that the distance calculation unit 135 finally outputs a number of the object distances D identical to a number of the objects to be detected.

In addition, although FIGS. 4A and 4B show that the processing unit 13 compares the signal features of different image regions between two images F and generates a combined image Fm, but the present disclosure is not limited thereto. In some embodiments, the processing unit 13 may compare signal features of different image regions between more than two images F and generate a combined image. In this case, in the Step S36 each image region having a maximum signal feature in corresponded image regions of more than two images is selected to form the combined image Fm, and details in other Steps S31 to S35 are similar to the first embodiment and thus details thereof are not repeated herein. In other words, the multiplexing module 133 of this embodiment may divide each image F captured by the image sensor 11 into identical (e.g. identical position and size) image regions such that the combined image Fm can have a size identical to the image F.

In a word, in the above embodiment, the processing unit 13 combines different partial image regions of different image frames to form a combined image according to the image quality of the partial image regions so as to calculate at least one object distance according to the combined image, wherein shapes and sizes of the partial image regions do not have particular limitations. For example, the processing unit 13 may combine, according to the image quality (e.g. the signal feature), a part of image regions in the first image $F_S$, e.g. a part of A1 to A4, with a part of image regions in the second image $F_L$, e.g. a part of A1' to A4', to form a combined image Fm.

Figure 5:
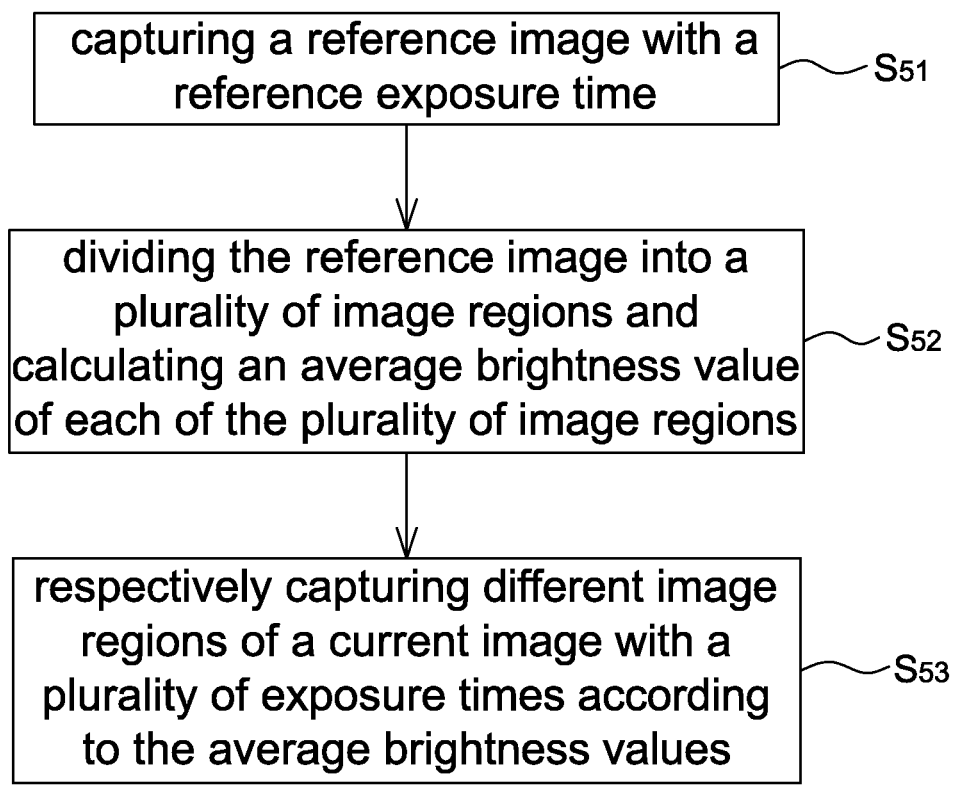
FIG. 5 is a flow chart of a distance measurement method of an optical distance measurement system according to a second embodiment of the present disclosure.

Referring to FIG. 5, it is a flow chart of a distance measurement method of an optical distance measurement system according to a second embodiment of the present disclosure, which includes the steps of: capturing a reference image with a reference exposure time (Step S51); dividing the reference image into a plurality of image regions and calculating an average brightness value of each of the plurality of image regions (Step S52); and respectively capturing different image regions of a current image with a plurality of exposure times according to the average brightness values (Step S53).

Referring to FIGS. 1-2, 5 and 6A-6B, details of the second embodiment of the present disclosure are described hereinafter. Similarly, the processing unit 13 also controls the light source 15 to emit light when the image sensor 11 is capturing images F.

Step S51: The image sensor 11 is controlled by the exposure control unit 131 of the processing unit 13 to capture a reference image $F_T$ with a reference exposure time ETr. In this embodiment, the reference image $F_T$ is configured to identify a plurality of exposure times ET for capturing a current image (e.g. $F_{T+1}$), and is not used to calculate an object distance D.

Step S52: After the processing unit 13 receives the reference image $F_T$, the multiplexing module 133 calculates, in a spatially multiplexed manner, average brightness values of a plurality of image regions in the reference image $F_T$ so as to determine a plurality of exposure times for capturing an image to be calculated Fm. For example, the multiplexing module 133 divides the reference image $F_T$ into a plurality of image regions A1 to A4 (referring to FIG. 6B), and respectively calculates average brightness values AV1 to AV4 of the image regions A1 to A4 (referring to FIG. 6B), wherein each of the different image regions A1 to A4 is one pixel row, a plurality of pixel rows, one pixel column, a plurality of pixel columns or a rectangular pixel region of the current image $F_{T+1}$, and is not limited to that shown in FIG. 6B.

Step S53: Finally, the exposure control unit 131 of the processing unit 13 controls the corresponding exposure times ET1 to ET4 (referring to FIGS. 6A to 6B) for capturing different image regions A1 to A4 of a current image $F_{T+1}$ according to the average brightness values AV1 to AV4. In one embodiment, the multiplexing module 133 of the processing unit 13 determines the plurality of exposure times ET1 to ET4 according to a comparison result of comparing the average brightness values AV1 to AV4 of the image regions A1 to A4 of the reference image $F_T$ with at least one threshold. For example, when identifying that the average brightness value AV1 is between two thresholds of a plurality of thresholds (or within one of a plurality of brightness intervals), the multiplexing module 133 directly determines, according to an exposure time (previously set and stored) corresponding to the two thresholds, the exposure time for capturing the image region A1 of the current image $F_{T+1}$ as ET1. The exposure times ET2 to ET4 corresponding to other image regions A2 to A4 are determined in the same way. In this embodiment, the current image $F_{T+1}$ is configured as the image to be calculated Fm.

Finally, the distance calculation unit 135 of the processing unit 13 calculates at least one object distance D according to the current image $F_{T+1}$.

In another embodiment, the multiplexing module 133 adjusts one exposure time step every time such that not all of the exposure times ET1 to ET4 corresponding to the image regions A1 to A4 of the current image $F_{T+1}$ are adjusted to target values according to one reference image $F_T$. In this case, when one of the brightness values of different image regions A1 to A4 of the current image $F_{T+1}$ is not within a predetermined brightness range, the exposure control unit 131 of the processing unit 13 may control a plurality of exposure times of the image sensor 11 for capturing different image regions A1' to A4' of a next image $F_{T+2}$ (referring to FIG. 6A) according to the average brightness values of the different image regions A1 to A4 of the current image $F_{T+1}$. When the multiplexing module 133 of the processing unit 13 identifies that all the brightness values of the image regions A1' to A4' of the next image $F_{T+2}$ are within a predetermined brightness range to be suitable for calculating the object distance, the distance calculation unit 135 of the processing unit 13 then calculates at least one object distance D according to the next image $F_{T+2}$. It is appreciated that the plurality of exposure times corresponding to the different image regions A1' to A4' of the next image $F_{T+2}$ may be partially identical to or totally different from the plurality of exposure times corresponding to the different image regions A1 to A4 of the current image $F_{T+1}$ depending on the average brightness values of the different image regions A1 to A4 of the current image $F_{T+1}$. When one of the average brightness values of the different image regions A1' to A4' of the next image $F_{T+2}$ is still not within a predetermined brightness range, the adjustment is continuously performed till average brightness values of all the image regions A1 to A4 are within the predetermined brightness range.

Figure 6A:
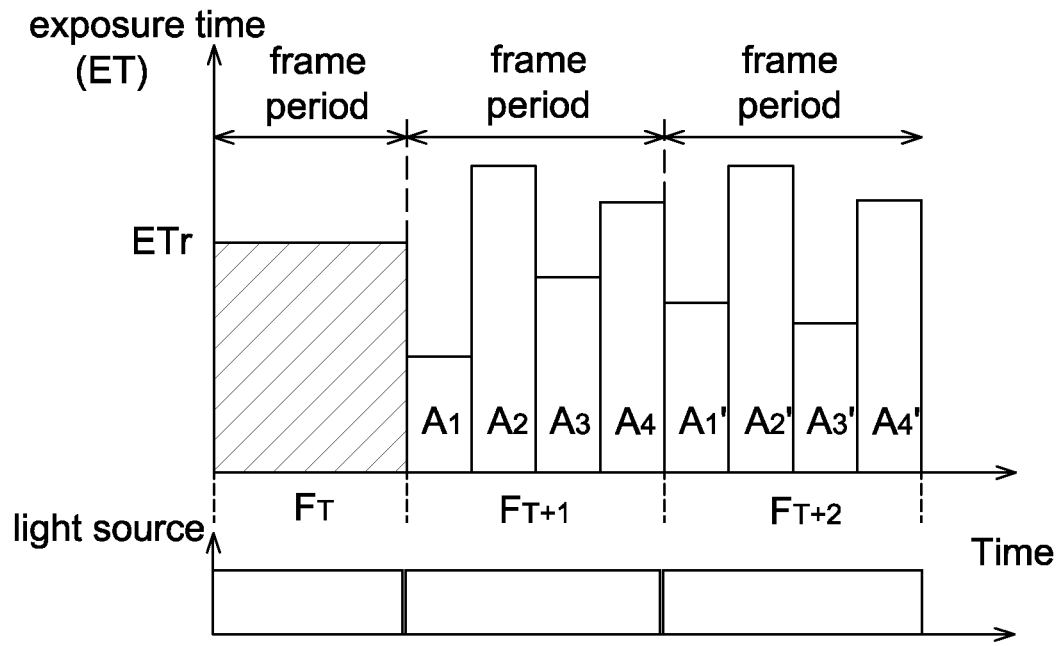
FIG. 6A is a timing diagram of the image capturing of an optical distance measurement system according to the second embodiment of the present disclosure.
Figure 6B:
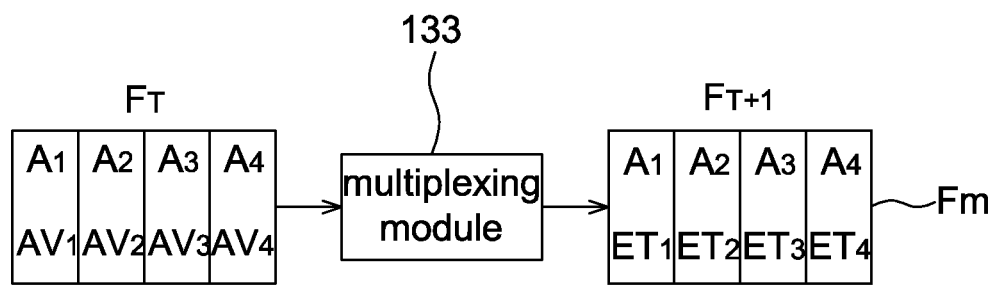
FIG. 6B is an operational schematic diagram of an optical distance measurement system according to the second embodiment of the present disclosure.

It should be mentioned that although in the Step S51 the image sensor 11 is illustrated by using one reference exposure time ETr as an example, the image sensor 11 may capture different image regions, e.g. image regions A1 to A4 shown in FIG. 6B, of the reference image $F_T$ with a plurality of identical exposure times ETr.

It should be mentioned that although in the above second embodiment the reference image $F_T$ is not used to calculate the object distance D, when average brightness values AV1 to AV4 of all the image regions A1 to A4 of the reference image $F_T$ are within a predetermined brightness range, the distance calculation unit 135 may directly calculate the object distance D according to the reference image $F_T$ without informing the exposure control unit 133 via the multiplexing module 133 to control the image sensor 11 to capture the current image $F_{T+1}$ with different exposure times ET, wherein the predetermined brightness rage may be previously set and stored in a storage unit.

Similarly, a number of the at least one object distance D is determined, for example, according to a number of pixel rows of the image F and a number of objects 9 without particular limitations.

It should be mentioned that although FIG. 6A shows that every image region A1 to A4 corresponds to different exposure times ET1 to ET4, but it is only intended to illustrate but not to limit the present disclosure. According to the image content actually being captured, only a part of the plurality of exposure times ET1 to ET4 corresponding to the different image regions A1 to A4 of the current image $F_{T+1}$ are different from each other.

In addition, in order to further eliminate the influence from ambient light, the processing unit 13 further controls the light source 15 to activate and deactivate corresponding to the image capturing of the image sensor 11, e.g. capturing a bright image corresponding to the activation of the light source 15 and capturing a dark image corresponding to the deactivation of the light source 15. The processing unit 13 further calculates a differential image between the bright image and the dark image to be configured as the first image $F_S$ and the second image $F_L$ of the first embodiment, or configured as the reference image $F_T$, the current image $F_{T+1}$ and the next image $F_{T+2}$ of the second embodiment.

In the above embodiment, the multiplexing module 133 of the processing unit 13 is configured to divide the image F and calculate signal features, e.g. the SNR or average brightness value, of different image regions so as to determine whether to output an image to be calculated Fm to the distance calculation unit 135 for calculating at least one object distance D. In the first embodiment, the exposure control unit 131 controls the image sensor 11 to capture different images (e.g. $F_S$ and $F_L$) with predetermined exposure times, and thus the exposure times that the exposure control unit 131 controls the image sensor 11 to capture different images F are fixed predetermined values (e.g. $ET_S$ and $ET_L$ in FIG. 4A). In the second embodiment, the multiplexing module 133 determines the exposure times corresponding to different image regions according to average brightness values of the different image regions and informs the exposure control unit 131, and thus the exposure times that the exposure control unit 131 controls the image sensor 11 to capture the different image regions may not be fixed predetermined values and are determined according to the actual calculation results (e.g. average brightness values).

The present disclosure further provides an imaging system employing the method for obtaining the combined image (e.g., Fm in FIG. 4B) in the above embodiments. By incorporating a dual-conversion-gain (DCG) sensing technology, it is able to obtain a high signal-to-noise ratio (SNR) in the dark region of an image frame obtained in high brightness environment, and a high SNR in the bright region of an image frame obtained in low brightness environment.

The combined image (referred to synthesis image hereinafter) in the above embodiment is formed by using so called digital-overlap (DOL) sensing technology. Using the DOL sensing technology, the dark region in a synthesis image acquired under high brightness environment has a high SNR. In addition to the above method for obtaining the combined image, the present disclosure is further adapted to other DOL sensing technology, e.g., referring to U.S. Patent Publication Numbers US 2016/0119575 and US 2017/0339325, but not limited to, and the full disclosures of which are incorporated herein by reference.

Using the DCG sensing technology, the bright region in a synthesis image acquired under low brightness environment has a high SNR. The present disclosure is adapted to any suitable DCG sensing technology, e.g., referring to U.S. Patent Publication Numbers US 2004/0251394 and US 2007/0013797, but not limited to, and the full disclosures of which are incorporated herein by reference.

Figure 7:
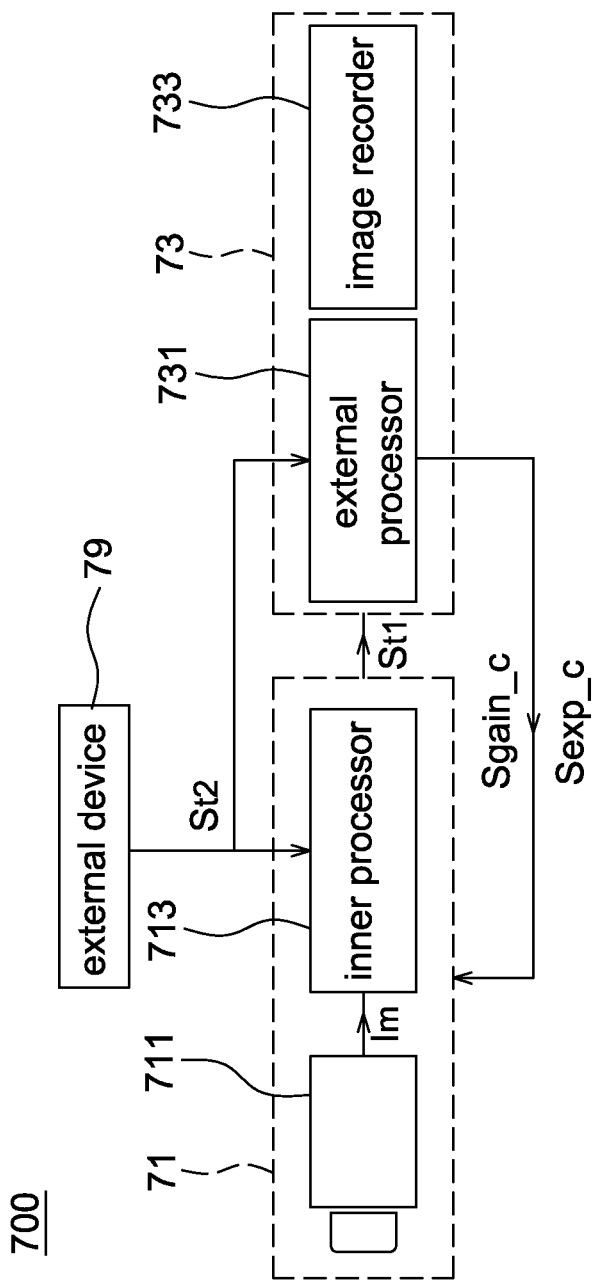
FIG. 7 is a block diagram of an imaging system according to one embodiment of the present disclosure.

Referring to FIG. 7, it is a block diagram of an imaging system 700 according to one embodiment of the present disclosure. The imaging system 700 includes a camera 71 and a control host 73 wired or wirelessly connected to each other. After the imaging system 700 enters a low power mode, the control host 73 stops receiving or recording images sent from the camera 71 so as to reduce the system power such that this state is referred to a low power mode herein. The method of entering the low power mode is known to the art and not a main objective of the present disclosure, and thus details thereof are not described herein.

The present disclosure is to allow the control host 73 to be able to correctly match, when the imaging system 700 is woken up by a trigger event (e.g., detected by the camera 71 or an external device 79) in the low power mode, an operating mode of the camera 711 as long as a first image frame is sent from the camera 71. In the present disclosure, the operating mode includes a DOL mode and a DCG mode.

The camera 71 includes an image sensor 711 and a processor 713, wherein in order to indicate that the processor 713 is inside the camera 71, FIG. 7 shows the processor 713 as an inner processor. In the present disclosure, functions executed by the image sensor 711 and the processor 713 are both considered to be executed by the camera 71.

The image sensor 711 is a CCD image sensor, a CMOS image sensor or the like, and is used to detect light within a field of view thereof to successively generate images Im to the processor 713.

The processor 713 is, for example, an application specific integrated circuit (ASIC) or a digital signal processor (DSP). In the low power mode, the processor 713 is used to identify ambient light intensity and perform trigger event detection. When the trigger event detection is positive and the ambient light intensity is larger than a first brightness threshold, the processor 713 controls the image sensor 711 to operate in the DOL mode to output a first exposure image and a second exposure image, wherein operation of the DOL mode is referred to FIG. 10 as an example in which an image 1 is acquired using the image capturing parameter AGain1 and Texp1, and an image 2 is acquired using the image capturing parameter AGain2 and Texp2. When the trigger event detection is positive and the ambient light intensity is smaller than a second brightness threshold, the processor 713 controls the image sensor 711 to operate in the DCG mode and outputs a synthesis image, wherein operation of the DCG is referred to FIG. 9 as an example in which a bright image and a dark image is obtained by amplifying an image acquired using one exposure time Texp respectively using conversion gains AGainL and AgainS, and the bright image and the dark image are for the image synthesis by the camera 71.

Figure 11A:
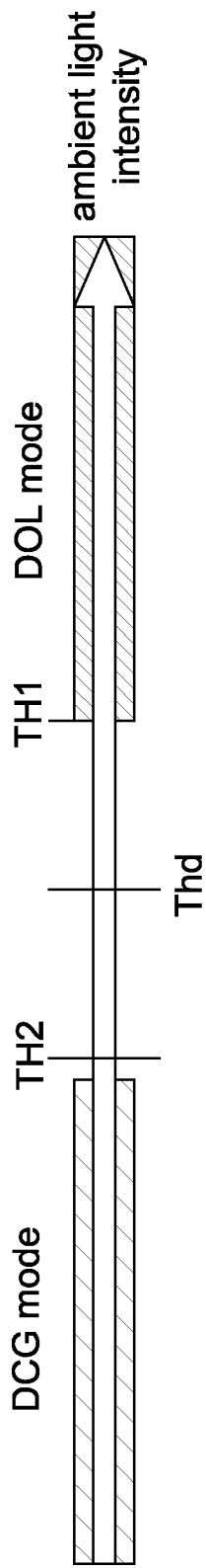
FIG. 11A is a schematic diagram of ambient light intensity and brightness thresholds of an imaging system according to one embodiment of the present disclosure.

In one aspect, the first brightness threshold is identical to the second brightness threshold, e.g., Thd shown in FIG. 11A. In another aspect, the first brightness threshold is different from the second brightness threshold, e.g., TH1 and TH2 shown in FIG. 11A. When the ambient light intensity is between the first brightness threshold and the second brightness threshold, the camera 71 uses any one of the DOL mode and the DCG mode after waking up since SNRs of bright and dark regions do not have significant difference between these two operating modes. For example, the imaging system 700 (including the camera 71 and the control host 73) uses an operating mode before the low power mode is entered last time, but not limited thereto.

In an alternative aspect, the camera 71 is pre-set to use one of the DOL mode and the DCG mode (i.e. one of the DOL mode and the DCG being a predetermined mode) after waking up when the ambient light intensity is between the first brightness threshold and the second brightness threshold. In an alternative aspect, the camera 71 is pre-set to use one of the DOL mode and the DCG mode after the camera 71 is powered up.

The camera 71 (more specifically the processor 713 thereof) identifies whether the trigger event detection is positive or not according to the detection result thereof or according to the detection result of the external device 79, wherein the external device 79 includes, for example, a thermal sensor, a PIR sensor, a doorbell, a touch panel or other sensors capable of detecting a moving object or a living body. In the present disclosure, said trigger event detection being positive is referred to that a person appears or any condition needs to be recorded or monitored occurs within the field of view of the camera 71.

In one aspect, the processor 713 of the camera 71 performs the trigger event detection according to the image Im generated by the image sensor 711. For example, when the image sensor 711 acquires images of a person or a moving object, the processor 713 generates a trigger signal St1 to the control host 73 for waking it up to cause the control host 73 to start recording images and performing corresponding controls.

In another aspect, the processor 713 of the camera 71 performs the trigger event detection according to a detection signal generated by an external thermal sensor. For example, the thermal sensor generates a trigger signal St2 when detecting a thermal image containing a person. In one aspect, the trigger signal St2 is sent to both the camera 71 and the control host 73 to wake up the camera 71 and the control host 73. In another aspect, the trigger signal St2 is sent to the camera 71 to wake up the camera 71 at first, and then the camera 71 sends a trigger signal St1 to the control host 73 to wake up the control host 73. That is, when the processor 713 confirms that a trigger event occurs according to the trigger signal St2 from the external thermal sensor, the processor 713 generates a trigger signal St1 to the control host 73 for waking it up.

In another aspect, the processor 713 of the camera 71 performs the trigger event detection according to a pressing signal generated by an external doorbell or an external touch panel. This aspect is adapted to a condition that a visitor presses the doorbell or touches the touch panel to generate the trigger signal St2. Similarly, according to different applications the trigger signal St2 is sent to the camera 71 and the control host 73 together, or sent to the camera 71 at first. For example, when the processor 713 confirms that a trigger event occurs according to the trigger signal St2 from the external doorbell or touch panel, the processor 713 generates a trigger signal St1 to the control host 73 for waking it up.

Said waking up the camera 71 includes the camera 71 capturing images at a higher frame rate, and identifying an operating mode according to ambient light intensity. Said waking up the control host 73 includes the control host 73 starting to receive and record different exposure images or synthesis images (illustrated below using an example) sent from the camera 71, and performing corresponding controls, e.g., opening a door lock, turning on a light source, informing a relevant personnel or the like according to the received images.

The camera 71 (more specifically the processor 713 thereof) identifies the ambient light intensity according to the detection and operation thereof or according to the detection and operation of the external device 79, wherein the external device 79 includes at least one of a light source and an ambient light sensor in this case.

In one aspect, the processor 713 of the camera 71 identifies the ambient light intensity according to a conversion gain and/or an exposure time obtained in an auto exposure procedure. As mentioned above, the present disclosure is adapted to waking up the imaging system 700. Accordingly, said auto exposure procedure is preferably a fast auto exposure procedure. For example, when the processor 713 generates the trigger signal St1 or receives the trigger signal St2, the fast auto exposure procedure is started. Said fast auto exposure procedure herein is referred to that the camera 71 uses a higher frame rate than that used in a normal mode to accomplish the auto exposure within a shorten time. For example, the camera 71 may operate at a frame rate 30 frames/second in the normal mode, and the fast auto exposure procedure uses a frame rate higher than 240 frames/second. The camera 71 accomplishes the auto exposure procedure within a predetermined time interval (e.g., 50 ms, but not limited to) after the trigger signal is generated and before an auto exposure parameter or a brightness parameter is sent to the control host 73. The processor 713 determines the ambient light intensity according to the conversion gain, the exposure time or conversion gain×exposure time obtained in the auto exposure procedure, or uses a function of the conversion gain and the exposure time (e.g., LGEP=64 $\log_2$(conversion gain×exposure time)+512) as the brightness parameter, which will be illustrated by an example below.

In another aspect, the processor 713 of the camera 71 identifies the ambient light intensity according to an intensity summation or an intensity average of an image Im generated (e.g., preferably after the auto exposure procedure) by the image sensor 711 in the low power mode.

In an alternative aspect, the processor 713 of the camera 71 identifies the ambient light intensity according to a driving strength or an operating frequency of a light source in the low power mode, wherein the light source is arranged on the camera 71 or separated therefrom to provide illumination in capturing images. For example, when the ambient light intensity is low (e.g., at night), the driving power or the operating frequency of the light source is high; whereas when the ambient light intensity is high (e.g., at daytime), the driving power or the operating frequency of the light source is low.

In an alternative aspect, the processor 713 of the camera 71 identifies the ambient light intensity according to an operating frequency of the image sensor 711 in the low power mode, wherein the camera 71 captures images at a lower frame rate in the low power mode than that in the normal mode. For example, when the ambient light intensity is low (e.g., at night), the operating frequency of the image sensor 711 is high; whereas when the ambient light intensity is high (e.g., at daytime), the operating frequency of the image sensor 711 is low.

In an alternative aspect, the processor 713 of the camera 71 identifies the ambient light intensity according to a detection signal of an external ambient light sensor in the low power mode, wherein the operation of the ambient light sensor is known to the art and thus details thereof are not described herein. In another aspect, the ambient light sensor is integrated with the camera 71.

Referring to FIG. 7 again, the control host 73 includes a processor 731 and an image recorder 733, wherein for indicating that the processor 731 is outside of the camera 71, FIG. 7 shows the processor 731 as an external processor. The processor 731 is, for example, a central processing unit (CPU) or a micro processing unit (MCU) of the control host 73. The image recorder 733 includes a memory, e.g., volatile and/or non-volatile memory, for recording images sent from the camera 71, and the images may be sent to a display device (not shown) for showing on the screen thereof.

In one aspect, the control host 73 receives a mode signal associated with the wakeup exposure mode from the camera 71 so as to know a data format of image frames (e.g., from a first image frame) that are received after being woken up. In other words, when the camera 71 identifies the trigger event detection to be positive (i.e. a trigger signal generated) and the ambient light intensity is larger than a first brightness threshold, in addition to outputting a first exposure image and a second exposure image, a DOL mode signal, which is indicated by at least one digital value 1 or 0 for instance, is further outputted to the control host 73; and when the camera 71 identifies the trigger event detection to be positive and the ambient light intensity is smaller than a second brightness threshold, in addition to outputting a synthesis image (sometimes referred to a gain synthesis image for indicating the characteristic thereof), a DGC mode signal, which is indicated by at least one digital value 0 or 1 for instance, is further outputted to the control host 73.

When the control host 73 receives the trigger signal St1 or St2, a wakeup procedure is started, wherein the wakeup procedure of the control host 73 includes starting to receive and record images sent from the camera 71. Furthermore, when receiving the DOL mode signal, the control host 73 (more specifically the processor 731 thereof) generates an exposure synthesis image according to the first exposure image and the second exposure image.

Figure 10:
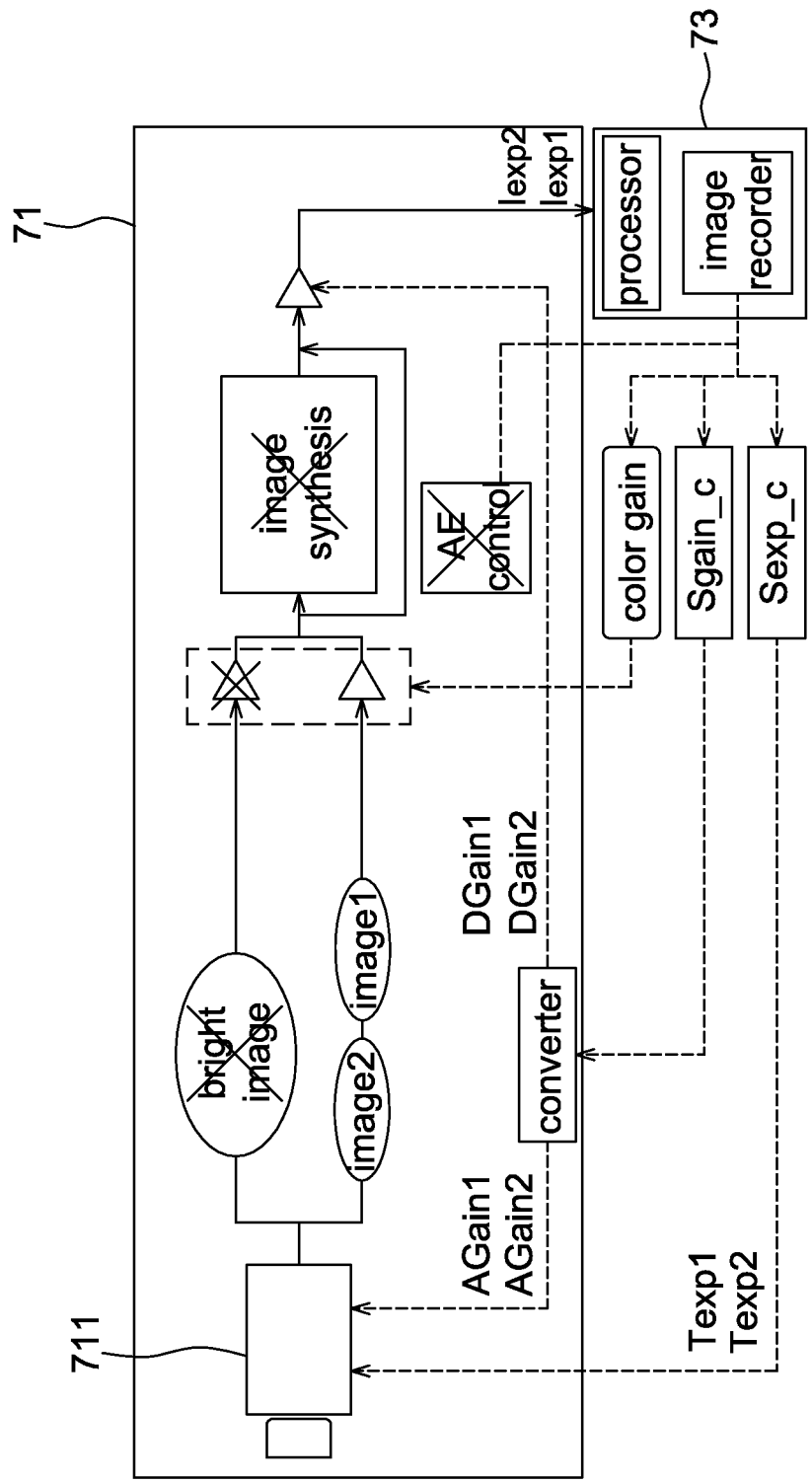
FIG. 10 is a schematic block diagram of an imaging system operating in a DOL mode according to one embodiment of the present disclosure.

In one aspect, the first exposure image, the second exposure image and the exposure synthesis image are respective the first image $F_S$, the second image $F_L$ and the combined image Fm mentioned in the above embodiment, referring to FIG. 4B. That is, the camera 71 captures the first exposure image with a first exposure time and captures the second exposure image with a second exposure time different from the first exposure time. The control host 73 divides the first exposure image into a plurality of first image regions, divides the second exposure image into a plurality of second image regions, compares signal features between the first image regions and the corresponding second image regions, and combines the first image region having the larger signal feature than the corresponding second image region with the second image region having the larger signal feature than the corresponding first image region to form the exposure synthesis image, such that the exposure synthesis image contains partial image regions from both the first exposure image and the second exposure image. That is, in the present disclosure, the different exposure images are acquired by the camera 71, and the image synthesis is performed by the control host 73, and thus FIG. 10 shows a function block of the image synthesis in the camera 71 has a cross symbol.

When receiving the DCG mode signal, the control host 73 (more specifically the processor 731 thereof) directly records the gain synthesis image in the image recorder 733. In the present disclosure, the gain synthesis image contains different image regions obtained by amplifying a same image, which is acquired by the camera 71, using different conversion gains (e.g., AGainL and AGainS shown in FIG. 9). For example, the dark region of the gain synthesis image is obtained by amplifying the corresponding region in the same image with a larger conversion gain AGainL, and the bright region of the gain synthesis image is obtained by amplifying the corresponding region in the same image with a smaller conversion gain AGainL such that the bright region in the gain synthesis image has a better SNR, wherein the bright and dark regions are determined by comparing pixel gray levels with at least one gray level threshold.

In the aspect that the camera 71 and the control host 73 are made by different manufacturers, the control host 73 is embedded with various thresholds, e.g., the first brightness threshold and the second brightness threshold, in the software and/or firmware thereof before shipment. When the camera 71 is connected to the control host 73 at first time (e.g., in the system installation), the control host 73 stores the first brightness threshold, the second brightness threshold and other operating algorithm into the memory of the camera 71. In this way, the camera 71 and the control host 73 have identical brightness identification mechanism.

In the present disclosure, when the camera 71 identifies that the trigger event detection is positive, the processor 713 thereof further outputs an auto exposure parameter (e.g., including conversion gain and exposure time obtained after the fast auto exposure procedure) and a trigger signal St1 to the control host 73. The auto exposure parameter is used to inform the control host 73 regarding the image capturing control on the camera 71 after being woken up. As mentioned above, when the trigger signal (e.g., St2) is detected by the external device 79 and directly sent to the control host 73, the processor 713 does not output the trigger signal St1 to the control host 73. In another aspect, when the trigger signal (e.g., St2) is detected by the external device 79 but only sent to the camera 71 without sending to the control host 73, the camera 71 still outputs the trigger signal St1 to the control host 73 based on the trigger signal St2.

In another aspect, the camera 71 transmits a brightness parameter (e.g., LGEP shown in FIG. 11B) to the control host 73. When the ambient light intensity is higher, a value of LGEP is smaller; whereas when the ambient light intensity is smaller, the value of LGEP is larger. In other words, in the above embodiment, when the ambient light intensity is larger than the brightness threshold Thd as FIG. 11A, a value of the brightness parameter LGEP is smaller than the parameter threshold Thd' as FIG. 11B; on the contrary, when the ambient light intensity is smaller than the brightness threshold Thd, the value of brightness parameter LGEP is larger than the parameter threshold Thd'. In the present disclosure, the ambient light intensity and the brightness parameter are examples of the parameter used to indicate environment brightness.

Figure 11B:
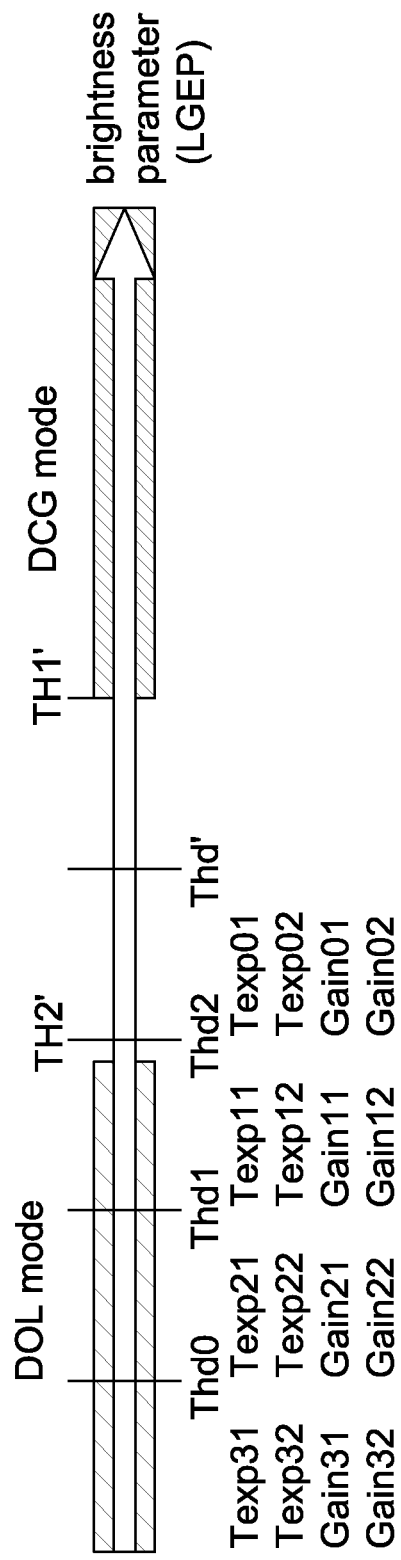
FIG. 11B is a schematic diagram of brightness parameter and parameter thresholds of an imaging system according to one embodiment of the present disclosure.

In one aspect, in the low power mode, the camera 71 performs the auto exposure procedure (i.e. the fast auto exposure procedure mentioned above) when the trigger signal (St1 or St2) is generated so as to determine an exposure time and a conversion gain. The camera 71 then calculates and outputs a brightness parameter LGEP using the exposure time and the conversion gain. Referring to FIG. 11B, when the brightness parameter LGEP is smaller than a parameter threshold (e.g., Thd'), different exposure images are outputted; whereas when the brightness parameter LGEP is larger than the parameter threshold (e.g., Thd'), the gain synthesis image is outputted, wherein the different exposure images and the gain synthesis image have been described above and thus details thereof are not repeated herein.

When receiving the trigger signal (St1 or St2), the control host 73 starts to end the low power mode. When receiving the brightness parameter LGEP, the control host 73 identifies the data format of images sent from the camera 71, e.g., identifying whether the different exposure images or the gain synthesis image will be sent. As mentioned above, when identifying (e.g., by comparing LGEP with parameter threshold) that the camera 71 will be operated in the DOL mode after being waking up, the control host 73 synthesizes the different exposure images into one exposure synthesis image, e.g., Fm shown in FIG. 4B, and then perform the image recording; whereas, when identifying that the camera 71 will be operated in the DCG mode after waking up, the control host 73 directly receives and records the gain synthesis image.

In this aspect, the control host 73 receives the brightness parameter LGEP from the camera 71 to be compared with the brightness parameter stored therein, but does not directly receive any mode signal from the camera 71. As mentioned above, the thresholds in the camera 71 are sent from the control host 73, and thus the camera 71 and the control host 73 record identical thresholds. The control host 73 knows the operating mode of the camera 71 after comparing the brightness parameter LGEP with the parameter threshold.

The trigger signal (St1 or St2) and the brightness parameter are received by the control host 73 with a predetermined time interval difference, and the auto exposure procedure of the camera 71 is preferably accomplished within the predetermined time interval. In other words, the camera 71 preferably accomplishes the fast auto exposure procedure before the control host 73 is fully woken up in order to identify the ambient light intensity before the control host 73 is fully woken up.

In another aspect, the camera 71 only sends the conversion gain and the exposure time obtained in the auto exposure procedure to the control host 73. The control host 73 calculates the brightness parameter (e.g., LGEP) by itself to confirm the exposure mode after being woken up.

In other aspects, the camera 71 transmits the ambient light intensity (e.g., obtained by the camera 71 or the external device 79 as mentioned above) to the control host 73. The control host 73 compares the received ambient light intensity with brightness threshold store therein to confirm the exposure mode after being woken up.

Generally, in the normal mode, the camera 71 acquires images according to a gain control signal Sgain_c and an exposure control signal Sexp_c from the control host 73, referring to FIG. 7. However, in the low power mode, the control signals Sgain_c and Sexp_c are not sent from the control host 73, the memory (not shown) of the camera 71 preferably previously records multiple first exposure times (e.g., Texp01 to Texp31 shown in FIG. 11B) and multiple first conversion gains (e.g., Gain01 to Gain 31 shown in FIG. 11B) for acquiring the first exposure image under different ambient light intensity, and multiple second exposure times (e.g., Texp02 to Texp32 shown in FIG. 11B) and multiple second conversion gains (e.g., Gain02 to Gain 32 shown in FIG. 11B) for acquiring the second exposure image under the different ambient light intensity.

Figure 12:
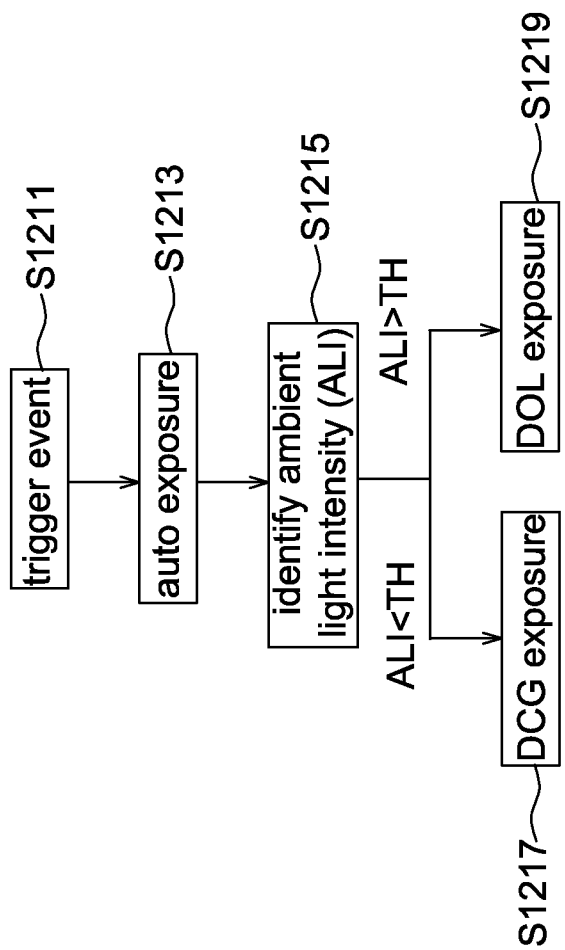
FIG. 12 is a flow chart of an operating method of an imaging system according to one embodiment of the present disclosure.

Referring to FIG. 12, it is a flow chart of an operating method of an imaging system 700 according to one embodiment of the present disclosure. The operating method includes the steps of: identifying a trigger event (Step S1211); performing an auto exposure procedure (Step S1213); identifying ambient light intensity (Step S1215); performing DCG exposure when the ambient light intensity (ALI) is smaller than a brightness threshold (Step S1217); and performing DOL exposure when the ambient light intensity is larger than the brightness threshold (Step S1219). As mentioned above, two different brightness thresholds, e.g., TH1 and TH2, may be used in different applications.

Figure 8:
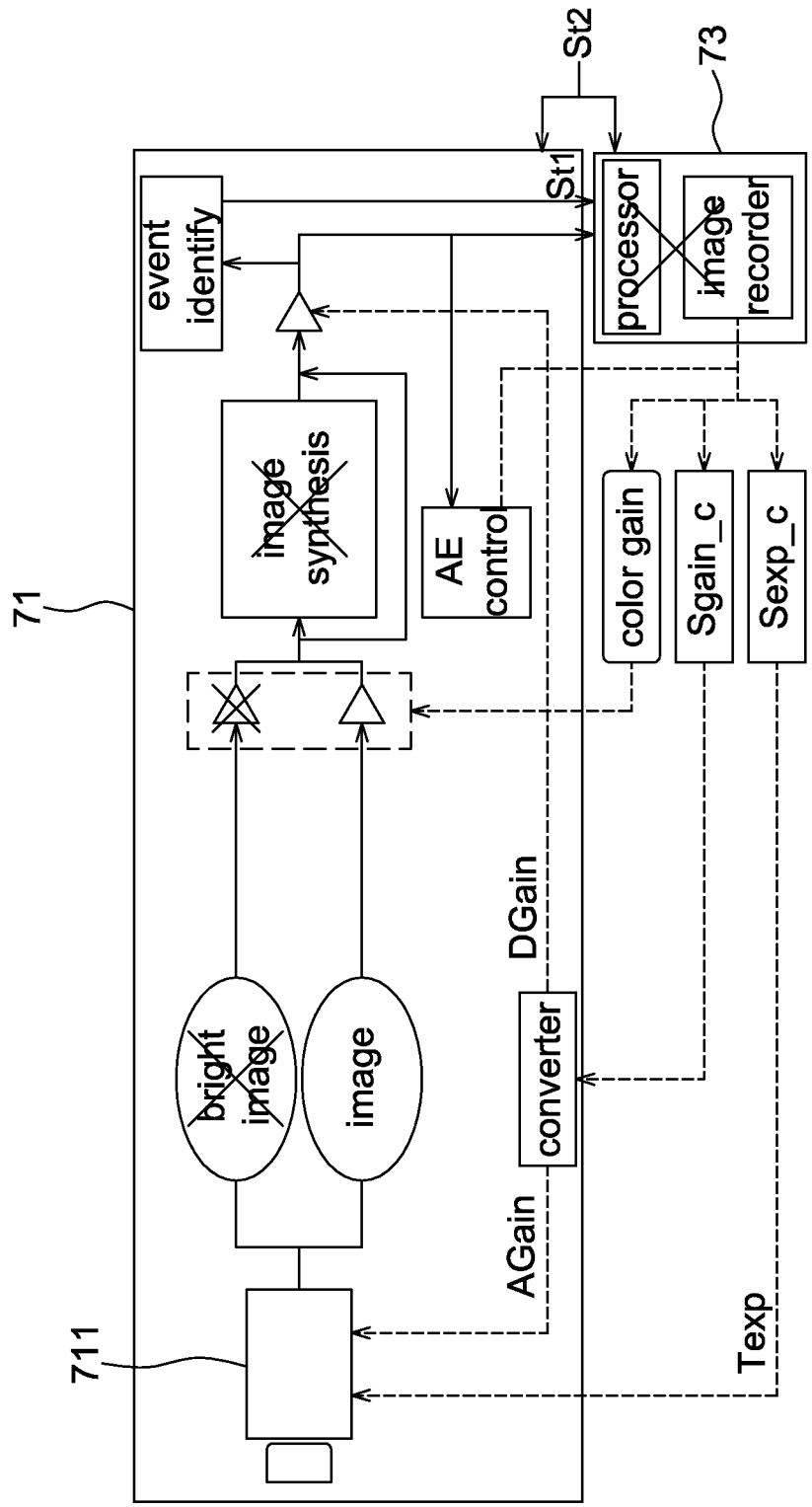
FIG. 8 is a schematic block diagram of an imaging system operating in a low power mode according to one embodiment of the present disclosure.
Figure 9:
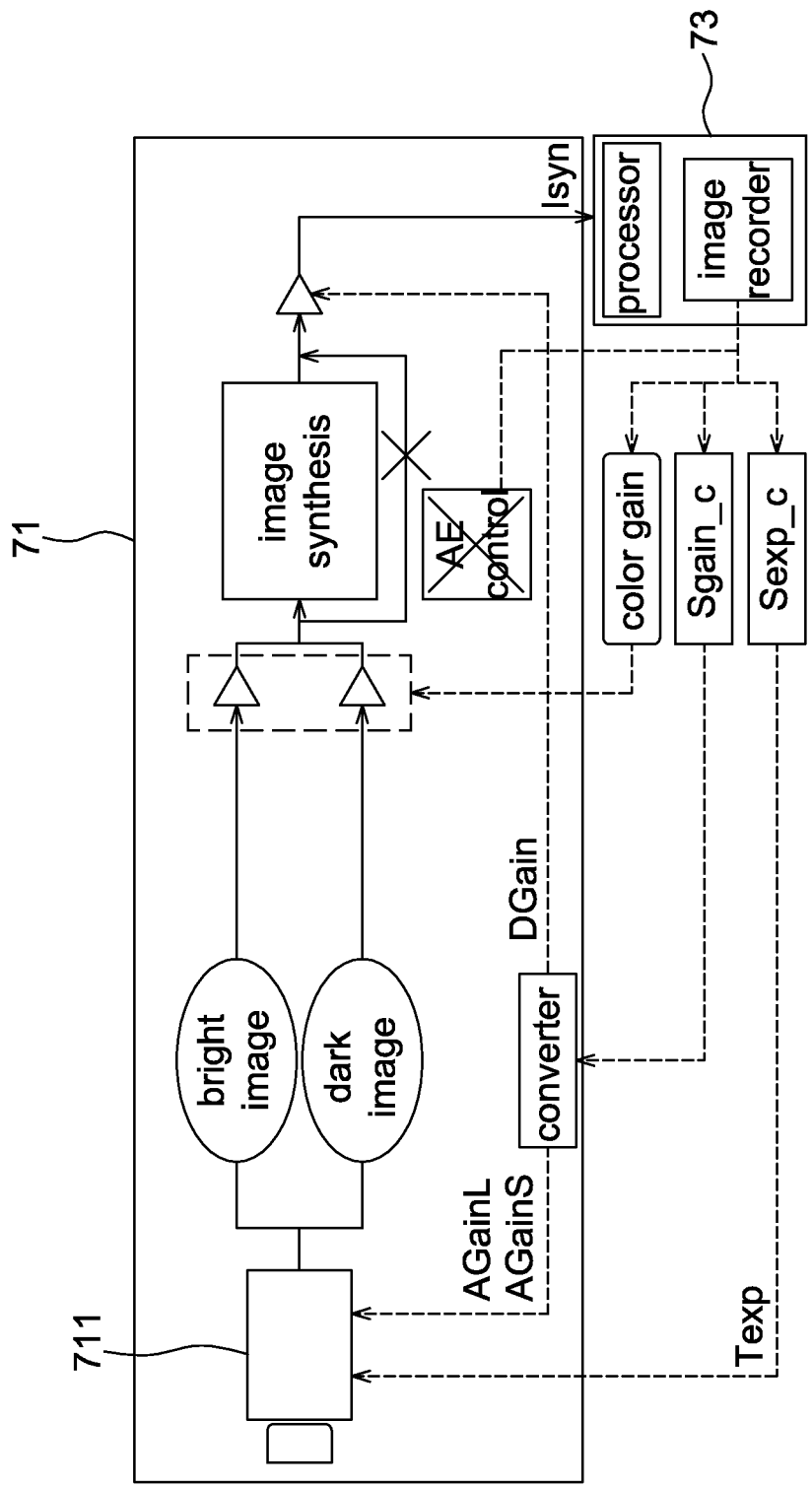
FIG. 9 is a schematic block diagram of an imaging system operating in a DCG mode according to one embodiment of the present disclosure.

Referring to FIGS. 7-12 together, details of this embodiment are described hereinafter. In FIGS. 8 to 10, functional blocks with a cross symbol are referred to those functional blocks being turned off or not being activated.

Step S1211: This operating method is executed when the imaging system 700 is in the low power mode. For example, the imaging system 700 identifies whether a trigger event occurs or not according to the schematic block diagram shown in FIG. 8. In the camera 71 of FIG. 8, the parts outside the image sensor 711 are functions executed by the processor 713 using software, hardware and/or firmware. As mentioned above, in one aspect the processor 713 performs trigger event detection according to the image outputted by the image sensor 711. When the trigger event detection is positive, a trigger signal St1 is generated to the control host 73. It is known that the image is processed by other procedures, e.g., amplified by a color gain, and the processing of the image is not limited to those shown in FIG. 8.

In another aspect, the trigger signal St2 is generated by an external device 79. After the trigger signal St1 or St2 is generated, it means that the imaging system 711 should be woken up, and thus the Step S1213 is entered.

Step S1213: Next, the camera 71 executes a fast auto exposure procedure so as to identify an exposure time and a conversion gain suitable for the current environment. Within an interval of performing the fast auto exposure procedure, the processor 713 generates a color gain, a gain control signal Sgain_c and an exposure control signal Sexp_c to perform the auto exposure since the control host 73 is not yet woken up. Details of the auto exposure are known to the art only the auto exposure in this step being a fast auto exposure as mentioned above.

Step S1215: Next, the processor 713 of the camera 71 identifies the ambient light intensity. As mentioned above, the processor 713 identifies the ambient light intensity according to the image generated by the camera 71, or according to the detection result of the external device 79. Then, an exposure mode of the imaging system 700 after being woken up is determined according to the ambient light intensity, wherein the comparison between the ambient light intensity and the brightness threshold is performed by the camera 71 or by the control host 73, and details thereof have been illustrated above and are not repeated herein. The processor 713 may determine the exposure mode using brightness parameter as mentioned above.

Step S1217: As shown in FIG. 11A, when the ambient light intensity (ALI) is smaller than a brightness threshold Thd (or the brightness parameter being larger than parameter threshold Thd' in FIG. 11B), a DGC mode is performed. As shown in FIG. 9, when the imaging system 700 operates in the DCG mode after being woken up (i.e. in the normal mode), the camera 71 amplifies a same image acquired by the image sensor 711 using a high conversion gain AGainL and a low conversion gain AGainS to obtain a bright image and a dark image. The processor 713 then performs the image synthesizing to generate a gain synthesis image Isyn to be sent to the control host 73.

Step S1219: As shown in FIG. 11A, when the ambient light intensity (ALI) is larger than the brightness threshold Thd (the brightness parameter being smaller than parameter threshold Thd' in FIG. 11B), a DOL mode is performed. As shown in FIG. 10, when the imaging system 700 operates in the DOL mode after being woken up (i.e. in the normal mode), the camera 71 sequentially acquires a first exposure image Iexp1 (or image 1) and a second exposure image Iexp2 (or image 2) respectively using a first set of image capturing parameter AGain1 and Texp1 and a second set of image capturing parameter AGain2 and Texp2. The processor 713 then sends the first exposure image Iexp1 and the second exposure parameter Iexp2 to the control host 73. The control host 73 then combines the first exposure image Iexp1 and the second exposure image Iexp2 as an exposure synthesis image and then records the exposure synthesis image, e.g., Fm in FIG. 4B, but not limited thereto.

After the imaging system 700 is woken up, the camera 71 and the control host 73 need to operate in the same mode such that the control host 73 is able to correctly receive the gain synthesis image or the first exposure image Iexp1 as well as the second exposure image Iexp2 from the camera 71 to perform the following operations. As mentioned above, the control host 73 receives the mode signal from the camera 71, or identifies the operating mode by itself according to the received brightness information (e.g., including exposure time and conversion gain or brightness parameter) according to different applications.

In the present disclosure, the low power mode is before the camera 71 outputs the gain synthesis image or the first and second exposure images to the control host 73.

As mentioned above, in dark and bright environment, different exposure modes can obtain different exposure performance to allow both bright and dark regions in a synthesis image to have good SNR. Therefore, the present disclosure further provides a camera and an imaging system using the same (FIGS. 7 to 10). The imaging system operates in a suitable exposure mode by identifying ambient light intensity during wake-up moment. In this way, the SNR of bright and dark regions in recorded image frames is improved thereby increasing accuracy of identification and control using these image frames.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A camera, comprising:
an image sensor, embedded with a digital-overlap (DOL) mode and a dual-conversion-gain (DCG) mode, and configured to generate images successively; and
a processor coupled to the image sensor and configured to,
in a low power mode,
identify ambient light intensity,
control the image sensor to operate in the DOL mode after waking up when the ambient light intensity is larger than a first brightness threshold, and
control the image sensor to operate in the DCG mode, in which a same image is acquired using a same exposure time and the same image is amplified by two different conversion gains to generate a synthesis image, after waking up when the ambient light intensity is smaller than a second brightness threshold.

2. The camera as claimed in claim 1, wherein
the first brightness threshold is different from the second brightness threshold, and
when the ambient light intensity is between the first brightness threshold and the second brightness threshold, the image sensor is controlled to operate in an operating mode before the low power mode is entered.

3. The camera as claimed in claim 1, wherein in the low power mode the processor is further configured to perform a trigger event detection
according to the images generated by the image sensor,
according to a detection signal generated by a thermal sensor outside the camera, or
according to a pressing signal generated by a doorbell or a touch panel outside the camera.

4. The camera as claimed in claim 1, wherein in the low power mode the processor is configured to identify the ambient light intensity
according to a conversion gain and/or an exposure time obtained in an auto exposure procedure,
according to an intensity summation or an intensity average of the images generated by the image sensor,
according to a driving strength or an operating frequency of a light source,
according to an operating frequency of the image sensor, or
according to a detection signal of an ambient light sensor outside the camera.

5. The camera as claimed in claim 1, wherein the processor is further configured to
perform a trigger event detection in the low power mode, and
output an auto exposure parameter as well as at least one of a trigger signal and a wakeup exposure mode when the trigger event detection is positive.

6. The camera as claimed in claim 1, wherein
the synthesis image comprises different image regions obtained by amplifying the same image, using the two different conversion gains.

7. The camera as claimed in claim 1, wherein in the DOL mode the image sensor is configured to output a first exposure image and a second exposure image, and the camera further comprises a memory configured to record
multiple first exposure times and multiple first conversion gains for acquiring the first exposure image under different ambient light intensity, and
multiple second exposure times and multiple second conversion gains for acquiring the second exposure image under the different ambient light intensity.

8. An imaging system, comprising:
a camera, embedded with a digital-overlap (DOL) mode and a dual-conversion-gain (DCG) mode, in which a same image is acquired using a same exposure time and the same image is amplified by two different conversion gains to generate a gain synthesis image, and the camera configured to, in a low power mode,
identify ambient light intensity,
output a DOL mode signal, a first exposure image and a second exposure image after waking up when the ambient light intensity is larger than a first brightness threshold, and
output a DCG mode signal and the gain synthesis image after waking up when the ambient light intensity is smaller than a second brightness threshold; and
a control host configured to
generate an exposure synthesis image according to the first exposure image and the second exposure image when the DOL mode signal is received, and
record the gain synthesis image when the DCG mode signal is received.

9. The imaging system as claimed in claim 8, wherein
the camera is configured to capture the first exposure image with a first exposure time and capture the second exposure image with a second exposure time different from the first exposure time; and
the control host is configured to divide the first exposure image into a plurality of first image regions, divide the second exposure image into a plurality of second image regions, compare signal features between the first image regions and the corresponding second image regions, and combine the first image region having the larger signal feature than the corresponding second image region with the second image region having the larger signal feature than the corresponding first image region to form the exposure synthesis image.

10. The imaging system as claimed in claim 8, wherein the first brightness threshold is different from the second brightness threshold, and
when the ambient light intensity is between the first brightness threshold and the second brightness threshold, the camera outputs a mode signal of an operating mode before the low power mode is entered.

11. The imaging system as claimed in claim 8, wherein the gain synthesis image comprises different image regions obtained by amplifying the same image, using the two different conversion gains.

12. The imaging system as claimed in claim 8, wherein when the camera is first time connected to the control host, the control host is further configured to store the first brightness threshold and the second brightness threshold into a memory of the camera.

13. The imaging system as claimed in claim 12, wherein the memory is further configured to record
multiple first exposure times and multiple first conversion gains for acquiring the first exposure image under different ambient light intensity, and
multiple second exposure times and multiple second conversion gains for acquiring the second exposure image under the different ambient light intensity.

14. The imaging system as claimed in claim 8, wherein in the low power mode the camera is further configured to perform a trigger event detection
according to an image acquired thereby,
according to a detection signal generated by an external thermal sensor, or
according to a pressing signal generated by an external doorbell or an external touch panel.

15. The imaging system as claimed in claim 8, wherein in the low power mode the camera is configured to identify the ambient light intensity
according to a conversion gain and/or an exposure time obtained in an auto exposure procedure,
according to an intensity summation or an intensity average of an image acquired thereby,
according to a driving strength or an operating frequency of a light source,
according to an operating frequency thereof, or
according to a detection signal of an external ambient light sensor.

16. The imaging system as claimed in claim 8, wherein the camera is further configured to
perform a trigger event detection in the low power mode, and
sequentially output a trigger signal and an auto exposure parameter to the control host when the trigger event detection is positive.

17. An imaging system, comprising:
a camera, embedded with a digital-overlap (DOL) mode and a dual-conversion-gain (DCG) mode, in which a same image is acquired using a same exposure time and the same image is amplified by two different conversion gains to generate a gain synthesis image, and the camera configured to, in a low power mode,
perform an auto exposure procedure when a trigger signal is generated to determine an exposure time and a conversion gain to accordingly calculate and output a brightness parameter,
operate in the DOL mode to output different exposure images when the brightness parameter is smaller than a parameter threshold, and
operate in the DCG mode to output the gain synthesis image when the brightness parameter is larger than the parameter threshold; and
a control host configured to receive the brightness parameter to accordingly identify a data format of images sent by the camera, wherein the trigger signal and the brightness parameter are received by the control host with a predetermined time interval difference, and the auto exposure procedure is accomplished within the predetermined time interval.

18. The imaging system as claimed in claim 17, wherein the gain synthesis image comprises different image regions obtained by amplifying the same image, using the two different conversion gains.

19. The imaging system as claimed in claim 17, wherein the camera is configured to, in the low power mode,
generate the trigger signal according to an image acquired thereby,
receive the trigger signal from an external thermal sensor, or receive the trigger signal from an external doorbell or an external touch panel.

20. The imaging system as claimed in claim 17, wherein the trigger signal is sent to both of the camera and the control host.

\* \* \* \* \*